(12) United States Patent
Tomimoto et al.

(10) Patent No.: US 7,470,487 B2
(45) Date of Patent: Dec. 30, 2008

(54) BATTERY AND BATTERY MANUFACTURING METHOD

(75) Inventors: Kazuo Tomimoto, Mihara-gun (JP);
Kazuki Shimozono, Sumoto (JP);
Etsuya Fujisaka, Tsuna-gun (JP);
Futoshi Nakano, Tsuna-gun (JP);
Hiroshi Hosokawa, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 348 days.

(21) Appl. No.: 10/895,416

(22) Filed: Jul. 21, 2004

(65) Prior Publication Data

US 2005/0042506 A1 Feb. 24, 2005

(30) Foreign Application Priority Data

Jul. 24, 2003 (JP) ............................. 2003-279291

(51) Int. Cl.
*H01M 2/02* (2006.01)
*B23K 26/00* (2006.01)

(52) U.S. Cl. .................. 429/169; 429/168; 429/167; 429/166; 429/164; 429/163; 219/121.64; 219/121.6; 219/121.61; 219/121.62; 219/121.63; 219/121.65

(58) Field of Classification Search .................. None
See application file for complete search history.

(56) References Cited

U.S. PATENT DOCUMENTS 6,163,011 A 12/2000 Urushizaki et al.
6,191,379 B1 * 2/2001 Offer et al. ................. 219/75
6,379,839 B1 4/2002 Inoue et al.

FOREIGN PATENT DOCUMENTS

| JP | 02-015985 | 6/1985 |
|----|-----------|--------|
| JP | 04-162351 | 6/1992 |
| JP | 08-293299 | 11/1996 |
| JP | 10-106536 A | 4/1998 |
| JP | 2000-77040 A | 3/2000 |

* cited by examiner

*Primary Examiner*—Patrick Ryan
*Assistant Examiner*—Cynthia Lee
(74) *Attorney, Agent, or Firm*—Westerman, Hattori, Daniels & Adrian, LLP

(57) ABSTRACT

A battery having a bundle of electrodes and separator which is made by winding a positive-electrode plate and a negative-electrode plate together with a separator therebetween, one of the positive- and negative-electrode plates being electrically connected to a power collecting body, the power collecting body being provided in and welded to an outer package can, wherein a welding portion of the outer package can and the power collecting body comprises a first layer and a second layer which are stacked in a thickness direction of the outer package can at the welding portion, and the second layer is in contact with a surface of the first layer and includes crystal grains that are minuter than crystal grains included in the first layer.

3 Claims, 4 Drawing Sheets

LASER
(HIGH ENERGY DENSITY)

LASER
(LOW ENERGY DENSITY)

BATTERY AND BATTERY MANUFACTURING METHOD

BACKGROUND OF THE INVENTION (1) Field of the Invention

The present invention relates to a battery that is manufactured using energy beams, and to a manufacturing method of the battery.

(2) Description of the Related Art

Energy beam welding is widely used for manufacturing batteries housed in metal outer package cans, as disclosed in Japanese Laid-Open Patent Applications H4-162351, H8-293299, and 2000-77040 and Japanese Patent Publication No. H2-15985.

A cylinder alkaline storage battery, for example, is manufactured as follows. First, a bundle of electrodes and separator is made by winding a positive-electrode plate and a negative-electrode plate together with a separator between them. The positive-electrode plate and negative-electrode plate of the bundle are welded to the positive- and negative-electrode power collecting bodies, respectively. Then the bundle is housed in a metal outer package can. The positive-electrode power collecting body is connected to an opening closure member that is at an opening end of the outer package can, and the negative-electrode power collecting body is welded to the bottom of the outer package can. More specifically, the negative-electrode power collecting body is welded to the bottom of the outer package can at approximately its center by applying energy beams there. Laser beams are widely used as the energy beams.

Such an energy beam welding fixes the negative-electrode power collecting body to the bottom of the outer package can with certainty. Also, with such a method in which energy beams are applied from outside, there is no need to insert the welding rod into the bundle of electrodes and separator housed in the outer package can. This also eliminates the need to provide a space for inserting the welding rod, which provides a merit of improving the energy density in the battery.

However, the welding portion formed by this energy beam welding has relatively large crystal grains and is therefore weak. This is because the welding portion is rapidly cooled at a rate of several thousands of degrees (° C.) per several milliseconds immediately after the portion is melted by the application of energy beams. For this reason, a crack may be generated in the welding portion (the weak layer), and the crack may grow to the extent that the electrolyte leaks from the outer package can. Such a problem is generated when a battery expands and shrinks by a rapid change in the internal pressure or temperature in the battery, which occurs when, for example, a manufactured battery is used in some electric tool or the like in such a severe condition that charges and discharges are repeated, each charge and discharge being caused for a short time by a large amount of current.

Some might think that the above-mentioned problem of the weak layer, which is generated by such rapid cooling, would be solved by performing, after the application of energy beams, an annealing process in which the welding portion is left out for several hours at a temperature as high as several hundreds of degrees (° C.). However, because of the structure and nature, batteries do not tolerate being left out for a long time at a temperature as high as several hundreds of degrees (° C.). As a result, such an annealing process is impossible in reality.

As described above, such a battery manufacturing method using energy beams has the above-mentioned problem. It is also expected that a similar problem will occur if the positive-electrode power collecting body is welded to the bottom of the outer package can.

SUMMARY OF THE INVENTION

The object of the present invention is therefore to provide a battery that prevents growth of cracks in the welding portion of the outer package can and the power collecting body to prevent leakage of electrolyte through the cracks so as to maintain an excellent battery performance, and a method of manufacturing the battery.

The above object is fulfilled by a battery having a bundle of electrodes and separator which is made by winding a positive-electrode plate and a negative-electrode plate together with a separator therebetween, one of the positive- and negative-electrode plates being electrically connected to a power collecting body, the power collecting body being provided in and welded to an outer package can, wherein a welding portion of the outer package can and the power collecting body comprises a first layer and a second layer which are stacked in a thickness direction of the outer package can at the welding portion, and the second layer is in contact with a surface of the first layer and includes crystal grains that are minuter than crystal grains included in the first layer.

The welding portion in the above-stated battery of the present invention is formed by first forming a welding portion, which corresponds to the first layer, having relatively large crystal grains by performing a normal laser welding, and then forming the second layer (reinforcement layer) having minuter crystal grains. With this construction, if a crack occurs in the first layer (weak layer) of the welding portion, growth of the crack is blocked by the reinforcement layer. This provides an effect of preventing the electrolyte from leaking. Accordingly, it is expected that the battery of the present invention maintains the excellent battery performance even if it is used in such conditions that would allow cracks to grow in a conventional battery, for example, in such conditions that require a large amount of current for charges and discharges.

It should be noted here that although one might think that the whole welding portion may be a reinforcement layer such as the second layer, the method for forming the welding portion as such is considered to be difficult. In contrast, the present invention makes full use of the normal welding method, avoiding a drastic change of the welding method. As a result, the present invention provides a relatively easy method for achieving such an excellent advantageous effect.

When the second layer is formed as described above, it is especially effective that the outer package can is in a shape of a cylinder with a bottom, and the power collecting body having been housed in the outer package can together with the bundle of electrodes and separator is welded to the bottom of the outer package can by energy beams applied from outside the outer package can.

The above object is also fulfilled by a battery manufacturing method having a welding step for welding a power collecting body to an outer package can, with the power collecting body being inside the outer package can and being electrically connected to one of a positive-electrode plate and a negative-electrode plate that have been wound together with a separator therebetween to form a bundle of electrodes and separator, wherein the welding step comprises: a first energy beam application sub-step for applying energy beams with a first amount of energy from outside the outer package can to weld the power collecting body to the outer package can and form a welding portion as a first layer including crystal grains in a direction crossing a thickness direction of the outer package can; and a second energy beam application sub-step for, after the first energy beam application sub-step, applying energy beams with a second amount of energy different from the first amount of energy, from outside the outer package can to form a second layer including crystal grains that are minuter than the crystal grains of the first layer so that the second layer is in contact with a surface of the first layer.

In the welding step of the above-described battery manufacturing method, a negative-electrode power collecting body connected to a bundle of electrodes and separator, which is made by winding a positive-electrode plate and a negative-electrode plate together with a seperator therebetween, may be welded to the bottom of a cylinder outer package can, and the first and second layers may be formed in the welding portion of the negative-electrode power collecting body and the bottom of the cylinder outer package can.

In the above-described battery manufacturing method, laser beams may be used as the energy beams.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1-1. Construction of Alkaline Storage Battery

Figure 1:
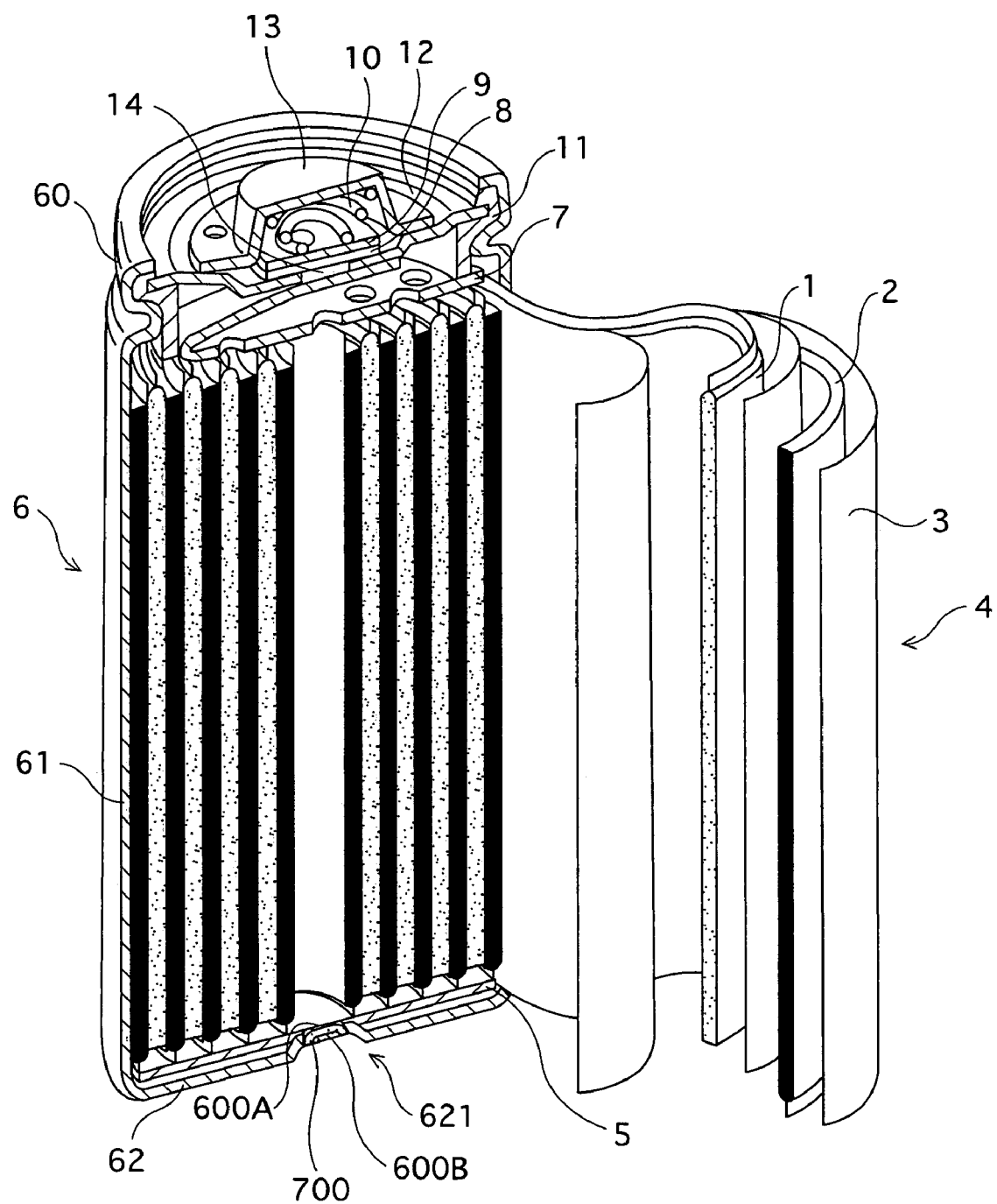
FIG. 1 is a sectional perspective view of a cylindrical alkaline storage battery in the embodiment of the present invention.

FIG. 1 is a sectional perspective view of a cylindrical nickel-cadmium (Ni—Cd) storage battery of the present invention.

The storage battery includes a cylindrical outer package can 6 of an SC size in which a bundle of electrodes and separator 4, electrolyte and the like are housed. The nominal capacitance may be, for example, 2.4 Ah. Alkaline solution is used as the electrolyte. In the present embodiment, a potassium-hydroxide-based solution is used as one example.

The cylindrical outer package can 6 is made by forming Ni-coated Fe into a cylinder with a bottom. Other metal materials such as a stainless material and aluminum may be used depending on the type or characteristics of the battery. A side surface 61 of the cylindrical outer package can 6 is coated with a resin film or a material for isolating the can from outside. A bottom 62 of the cylindrical outer package can 6 has an inward dent 621 approximately at a center of the bottom. The dent 621 is connected to a negative-electrode power collecting body 5.

It is not imperative but is preferable to form the dent 621 for the sake of facilitating the connection.

An opening end 60, an upper portion in FIG. 1, of the cylindrical outer package can 6 is fitted with an insulation/sealing gasket 11 and an opening closure member 12 and then caulked so that the cylindrical outer package can 6 is hermetically closed, with an opening at the opening end 60 being closed.

The bundle of electrodes and separator 4 is made by winding a positive-electrode plate 1 and a negative-electrode plate 2 together with a separator 3 between them.

The positive-electrode plate 1 is, for example, a sintered nickel positive-electrode plate which is made by forming a nickel sintering porous material on a surface of a punching metal and then filling the nickel sintering porous material with a nickel-hydroxide-based active material by a chemical impregnation method. The positive-electrode plate 1 is connected to a positive-electrode terminal 13 via a positive-electrode power collecting body 7 and the opening closure member 12, where the positive-electrode power collecting body 7 is composed of a porous disk.

The negative-electrode plate 2 is, for example, a sintered cadmium negative-electrode plate which is made by, as is the case with the positive-electrode plate 1, forming a nickel sintering porous material on a surface of a punching metal and then filling the nickel sintering porous material with a cadmium-hydroxide-based active material by a chemical impregnation method. The negative-electrode plate 2 is connected to the dent 621, which functions as a negative-electrode terminal, of the bottom 62 of the cylindrical outer package can 6 via the negative-electrode power collecting body 5 that is a porous disk made of Fe coated with Ni.

The separator 3 is constructed from a micro-porous film having excellent insulation property, such as nylon or polypropylene. The separator 3 is well impregnated with the electrolyte and is used to electrically insulate the positive-electrode plate 1 and the negative-electrode plate 2 from each other.

The rim of the opening closure member 12 is surrounded by the insulation/sealing gasket 11. The opening closure member 12 has a hole (gas venting hole) 14 at a center thereof. The hole 14 is covered with a bowl-shaped positive-electrode terminal 13.

In a space between the opening closure member 12 and the positive-electrode terminal 13, a valve plate 8, a retaining plate 9, and a coil spring 10 are provided in the stated order from bottom to top. The valve plate 8 and the retaining plate 9 on the hole 14 is pressed by the elastic force of the coil spring 10 toward the outside downward, allowing them to act as a safety valve. An elastomer made of rubber or the like may be provided instead of the valve plate 8, retaining plate 9, and coil spring 10.

The construction of the battery in the present embodiment is characterized in that a reinforcement layer 700 is formed in a welding portion of the negative-electrode power collecting body 5 and the cylindrical outer package can 6, in a direction crossing the thickness direction of the cylindrical outer package can 6.

The following describes the reinforcement layer 700 and the process of forming thereof within the process of manufacturing the battery in the present embodiment.

1-2. Process of Manufacturing Battery in Present Embodiment

Conventional procedures may be used in general in the process of manufacturing the battery in the present embodiment.

First, the bundle of electrodes and separator 4 is made by winding the positive-electrode plate 1 and the negative-electrode plate 2 together with the separator 3 between them so as to be appropriate in size relative to the cylindrical outer package can 6.

Next, the porous positive-electrode power collecting body 7 and the negative-electrode power collecting body 5 are attached to the upper and lower portions of the bundle of electrodes and separator 4 by the spot welding, respectively.

Following this, a welding process and an annealing process are performed in sequence in which energy beams having different strengths are applied to the negative-electrode power collecting body 5 and the bottom 62 at the dent 621. Such an energy beam application of the present invention enables the reinforcement layer 700 to be formed in the welding portion so that both surfaces thereof are respectively in contact with weak layers 600A and 600B in the welding portion that are formed in the welding process. This prevents the electrolyte from leaking through a crack formed in the welding portion, ensuring excellent battery performance. The energy beam application is performed in the following procedures.

<Welding Negative-Electrode Power Collecting Body and Outer Package Can>

A cylinder with a bottom is prepared as the cylindrical outer package can 6. The negative-electrode power collecting body 5 is placed inside the cylindrical outer package can 6 at the bottom so that they face each other. The bundle of electrodes and separator 4 is then housed in the cylindrical outer package can 6. Energy beams having different strengths are then applied, sequentially in respective two steps, to the negative-electrode power collecting body 5 and the bottom 62 at the dent 621.

In the first step, the welding process is performed by applying a laser beam. With the application of the laser beam, the negative-electrode power collecting body 5 and the bottom 62 melt at the dent 621, and after the melting portion is hardened later, the welding portion (that substantially corresponds to the weak layers) is formed.

In the second step, the annealing process is performed by applying a laser beam that is weaker than that in the first step to the same spot. With the application of the weaker laser beam, the reinforcement layer 700 is formed in the welding portion so that both surfaces of the reinforcement layer 700 are respectively in contact with weak layers 600A and 600B.

It should be noted here that in these steps, laser beams are used for the welding and annealing as an example of the energy beams.

Conditions for the laser application in the first step are, for example, as follows. The following value settings for the step are similar to those for conventional laser welding, and can be adjusted appropriately.

Pulse application time: 8 ms/pulse
Energy density per unit area: 12.7 J/mm$^2$
Laser application area/shape: circular spot being 1.0 mm in diameter
Total amount of energy: 10 J With application of a high-energy-density pulse laser to the dent 621 of the bottom 62 to meet the above conditions, the cylindrical outer package can 6 and the negative-electrode power collecting body 5 are laser-welded.

Figure 2A:
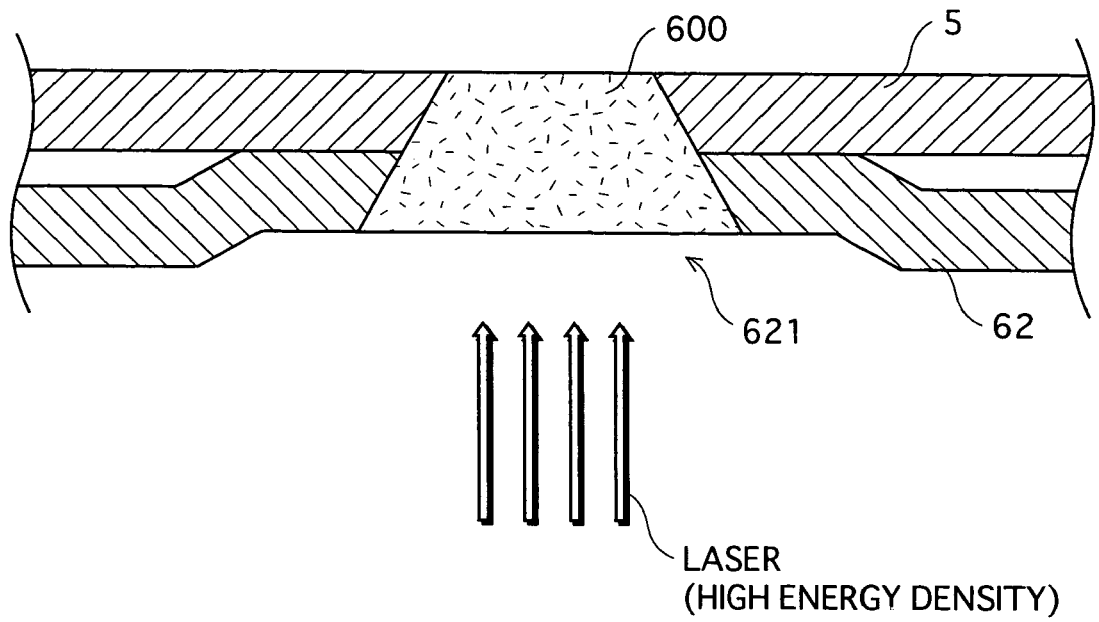
FIGS. 2A and 2B are partial sectional views showing a welding portion corresponding to two types of laser applications.

FIG. 2A shows the welding portion of the negative-electrode power collecting body 5 and the dent 621 of the bottom 62 formed by the laser application. The structure of the welding portion at this stage is the same as the conventional one. That is to say, due to the rapid quenching effect after the laser welding, crystal grains of a weak layer 600 are relatively coarse and low in mechanical strength.

Following the first step, the second step is performed to apply laser to meet conditions that are easier than those in the first step so that the melting depth is shallower than the first step. A rough standard for setting the conditions is that one pulse laser application is not enough to weld. It is also preferable for the laser application in the second step that the laser spot is relatively broad enough to cover the surface of the weak layer 600 formed in the first step. The following are an example of the conditions.

Figure 2B:
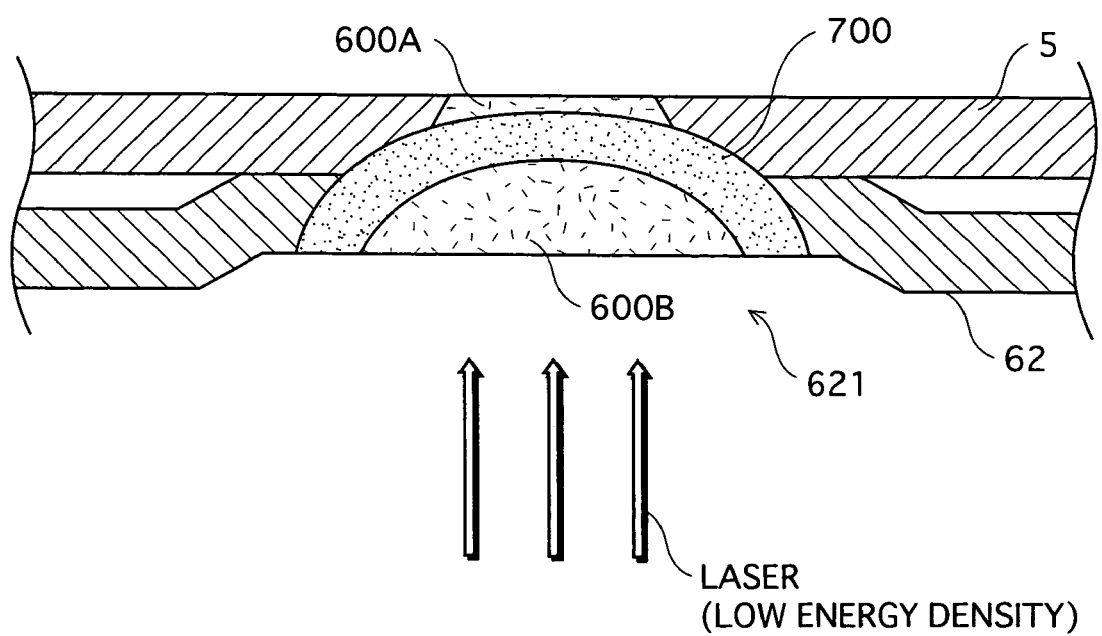

Pulse application interval: 20 ms/pulse
Energy density per unit area: 6.8 J/mm$^2$
Laser application area/shape: circular spot being 1.5 mm in diameter
Total amount of energy: 12 J FIG. 2B shows the welding portion after the second step is performed. As shown in FIG. 2B, the energy of the laser newly added to the surface of the welding portion exerts a thermal influence upon the composition at a certain depth from the surface, performing the annealing process. This changes the composition of the weak layer 600, which has been formed by the first step, at approximately the center in the thickness direction (that is to say, the thickness direction of the bottom of the cylindrical outer package can 6) to form the reinforcement layer 700, which has relatively small crystal grains and is high in mechanical strength, between the weak layers 600A and 600B. The formation position of the reinforcement layer 700 can be changed by adjusting a position at which the applied energy concentrates, by adjusting the laser driving conditions (application position, focus position or the like) based on the above-mentioned conditions. The laser energy is accumulated at the bottom 62 of the cylindrical outer package can 6 in the thickness direction and then extends radially. As a result, the reinforcement layer 700 has a shape of a parabola in the cross section as shown in FIG. 2B.

Such a laser application of the present invention performed in two steps provides the following advantageous effects.

In conventional welding of the negative-electrode power collecting body and the bottom of the cylindrical outer package can by energy beam (for example, laser beam) application from outside, the weak layer 600 having relatively coarse crystal grains constitutes the whole welding portion.

Figure 3:
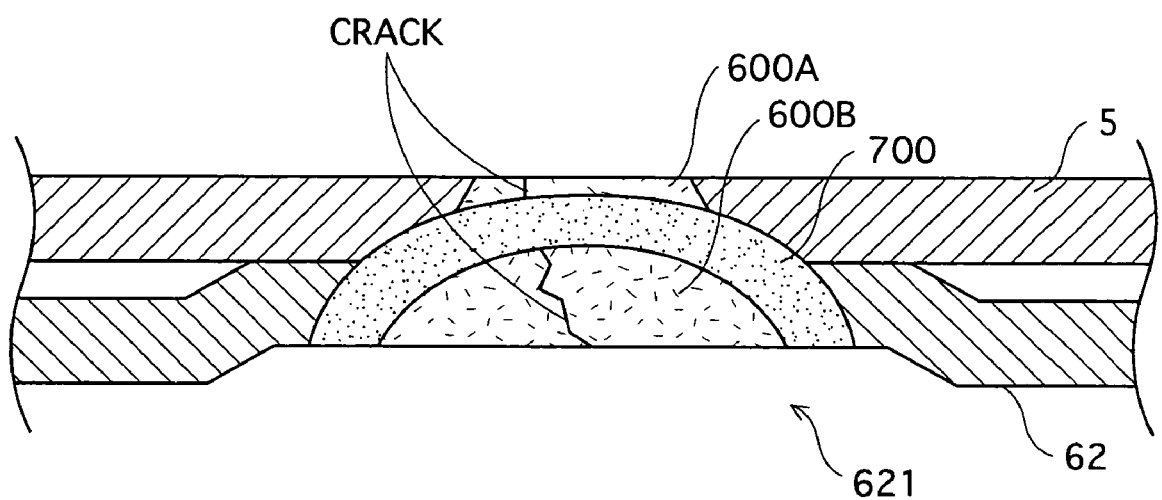
FIG. 3 shows the bottom of the outer package can with cracks.
Figure 4:
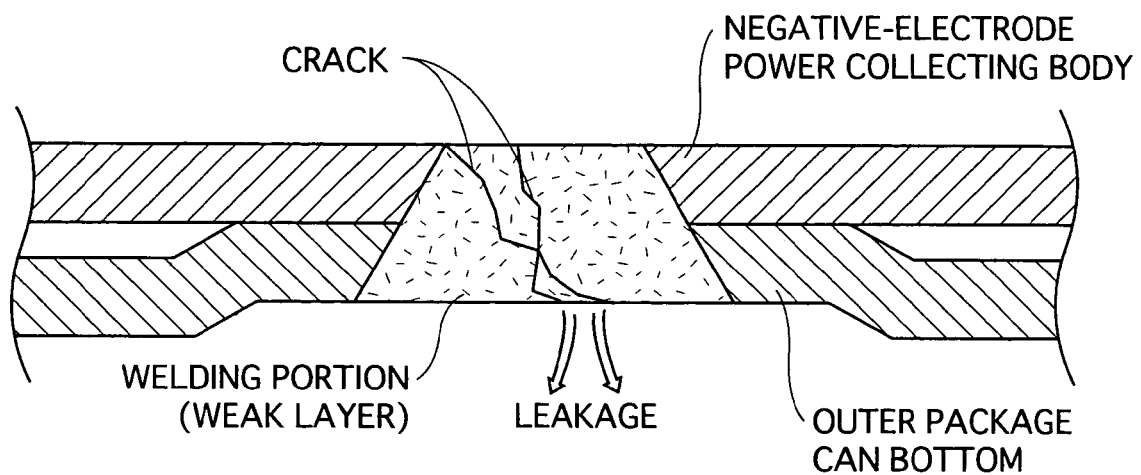
FIG. 4 shows the bottom of a conventional outer package can with cracks.

The weak layer 600 is generated when strong energy beams are applied for a short time and then rapidly cooled at a rate of several thousands of degrees (° C.) per several milliseconds. The weakness of the weak layer 600 may be a cause of not being able to ensure enough mechanical strength for the performance of the battery. More specifically, conventional batteries had a problem that a crack is generated in the welding portion (the weak layer) due to occurrence of Intergranular Stress Corrosion Cracking or the like, the crack growing to the extent that the electrolyte leaks from the outer package can, as shown in FIG. 4. Such a problem is generated when a battery expands and shrinks by a rapid change in the internal pressure or temperature in the battery, which occurs when, for example, a manufactured battery is used in some electric tool or the like in such a severe condition that charges and discharges are repeated, each charge and discharge being caused for a short time by a large amount of current. In contrast, the battery of the present embodiment is provided with the reinforcement layer 700 formed between the weak layers 600A and 600B in the thickness direction of the negative-electrode power collecting body 5 and the bottom 62 of the cylindrical outer package can 6, as shown in FIG. 3. With this construction, if a crack occurs in the weak layer 600A or 600B, transmission of the crack to the other weak layer in the thickness direction is blocked by the reinforcement layer 700. This prevents the above-mentioned problem from occurring, with reliability. That is to say, the construction of the present invention prevents the electrolyte from leaking even if the battery is used in the above-described severe conditions.

Also, the two-step laser application hardly causes a thermal damage inside the battery since the laser beams are applied only to the limited area, namely the welding portion, and the whole battery is not heated by the laser application. This requires the minimum amount of heating, contributing to reduction of the manufacturing cost.

It is possible to check whether the reinforcement layer 700 has actually been formed or how the layer is constructed, by cutting the welding portion and observing the cut plane using an electron microscope or the like. With such observation it will be confirmed that the reinforcement layer 700 is composed of crystal grains that are minuter and denser than those of the weak layers 600A and 600B.

Also, by varying the number of laser applications performed in the second step, the thickness or size of the reinforcement layer 700 can be adjusted as desired.

After the negative-electrode power collecting body 5 and the dent 621 in the bottom 62 of the cylindrical outer package can 6 are welded and annealed by the two-step laser application, the porous positive-electrode power collecting body 7 is attached to the positive-electrode terminal 13 and the opening closure member 12 by spot welding or the like. The cylindrical outer package can 6 is then filled with the electrolyte. The opening closure member 12 is then fitted into the opening end 60 of the cylindrical outer package can 6 via the insulation/sealing gasket 11, and fixed to the cylindrical outer package can 6 by caulking. This completes the manufacturing of the hermetically closed battery in the present embodiment.

1-3. Performance Comparison Experiment

A performance comparison experiment was conducted for a comparison between a conventional battery and the battery of the present embodiment. For the experiment, a sample conventional battery having a conventional construction was manufactured as follows.

Manufacturing Sample Conventional Battery

As a whole, the sample conventional battery was manufactured in the same manner as the battery in the present embodiment. More specifically, a bundle of electrodes and separator was made by winding a nickel positive-electrode plate and a cadmium negative-electrode plate together with a separator between them. A positive-electrode power collecting body and a negative-electrode power collecting body were attached to the upper and lower portions of the bundle of electrodes and separator, respectively. The bundle of electrodes and separator was housed in a cylindrical outer package can, with the negative-electrode power collecting body at the bottom.

Laser beams were applied from outside to the bottom of the outer package can to weld the negative-electrode power collecting body and the bottom of the outer package can. Conditions for this laser application are as follows.

Pulse application interval: 8 ms/pulse
Energy density per unit area: 12.7 J/mm$^2$
Laser application area/shape: circular spot being 1.0 mm in diameter
Total amount of energy: 10 J After the laser welding, the positive-electrode power collecting body was attached to the positive-electrode terminal and the opening closure member 12. The cylindrical outer package can was then filled with electrolyte. The opening closure member was then fitted into the opening end of the cylindrical outer package can via a gasket, and fixed to the cylindrical outer package can by caulking to hermetically close the cylindrical outer package can.

In this manner, a nickel-cadmium battery (the sample conventional battery) of SC size with nominal capacitance of 2.4 Ah was manufactured.

Twenty batteries of the present embodiment and twenty sample conventional batteries were manufactured for the experiment, in accordance with the above-described manufacturing procedures, respectively.

In the experiment, a cycle of "6.5A-$\Delta$V charge→no halt→discharge 20A to 0.8V→halt for one hour" was repeated 1,000 times for each battery. After the experiment, the number of leakages of electrolyte from the welding portion were counted, and the change of the battery capacitance was measured.

The following are the results.

Experiment Results
  Sample Conventional Battery
    The number of leakages: 3/20
    Average battery capacitance: 946 mAh (measurement value range: 911 mAh-982 mAh)
  Battery of Present Embodiment
    The number of leakages: 0/20
    Average battery capacitance: 1, 004 mAh (measurement value range: 934 mAh-1,074 mAh)

The above experiment results show that the battery of the present embodiment provide an advantageous effect that if a crack occurs in the welding portion at the bottom of the outer package can, transmission of the crack is blocked by the reinforcement layer and the excellent battery performance is maintained. Accordingly, the battery of the present embodiment maintains the battery capacitance in a stable manner and maintains the excellent battery performance if the battery is used in a severe condition that a large amount of current is required for the charging and discharging.

2. Others

The description of the present embodiment was mainly related to a cylindrical alkaline storage battery and the manufacturing method thereof. However, the present invention can be applied to other types of batteries such as a battery with a square metal outer package can.

Also, the present invention may be applied to a nickel-hydrogen storage battery, a nonaqueous-system storage battery, or a primary battery, not limited to a nickel-cadmium storage battery.

In the present embodiment, laser beams are used as energy beams. However, not limited to this, other energy beams such as EB (electronic beams) may be used instead.

When forming the reinforcement layer in the welding portion, it is preferable that the energy beams are applied to the whole length and breadth of the area to which energy beams have been applied in the first stage (that is to say, to cover at least the whole area of the weak layer exposed to outside at the bottom of the outer package can), for the purpose of preventing the leakage of the electrolyte with certainty. However, if the reinforcement layer is formed as part of the welding portion, the effect of preventing the electrolyte leakage is achieved to a certain extent.

In the present embodiment, the weak layers 600A and 600B are stacked with the reinforcement layer 700 between them. However, the advantageous effect of the present invention is obtained in so far as the reinforcement layer 700 is formed at a position where it is possible to prevent the electrolyte from leaking through cracks in the welding portion. Accordingly, only one weak layer 600 and the reinforcement layer 700 may be formed in the welding portion in a direction crossing the thickness direction of the outer package can. In this case, the weak layer 600 may be in contact with any of the two surfaces of the reinforcement layer 700. Furthermore, the reinforcement layer 700 may be formed to be exposed to outside from the dent 621 of the outer package can bottom by adjusting the laser output, focus position or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A battery having a bundle of electrodes and separator which is made by winding a positive-electrode plate and a negative-electrode plate together with a separator therebetween, one of the positive- and negative-electrode plates being electrically connected to a power collecting body, the power collecting body being provided in and welded to an outer package can, wherein a welding portion of the outer package can and the power collecting body comprises a first layer and a second layer which are stacked in a thickness direction of the outer package can at the welding portion, and the second layer is in contact with a surface of the first layer and is comprised of crystal grains that are minuter than crystal grains of the first layer;

wherein the first layer and the second layer are formed by beam welding.

2. The battery of claim 1, wherein the welding portion further includes another first layer on an opposite side of the second layer, the second layer being sandwiched between the two first layers.

3. The battery of claim 1, wherein the outer package can is in a shape of a cylinder with a bottom, and the power collecting body is welded to the bottom of the outer package can by energy beams applied from outside the outer package can.

* * * * *